Feb. 4, 1936. W. REISS 2,029,543
METHOD OF AND MEANS FOR CREATING AND DISPLAYING
DECORATIVE EFFECTS WITH LIGHT
Filed Feb. 24, 1931 4 Sheets-Sheet 2
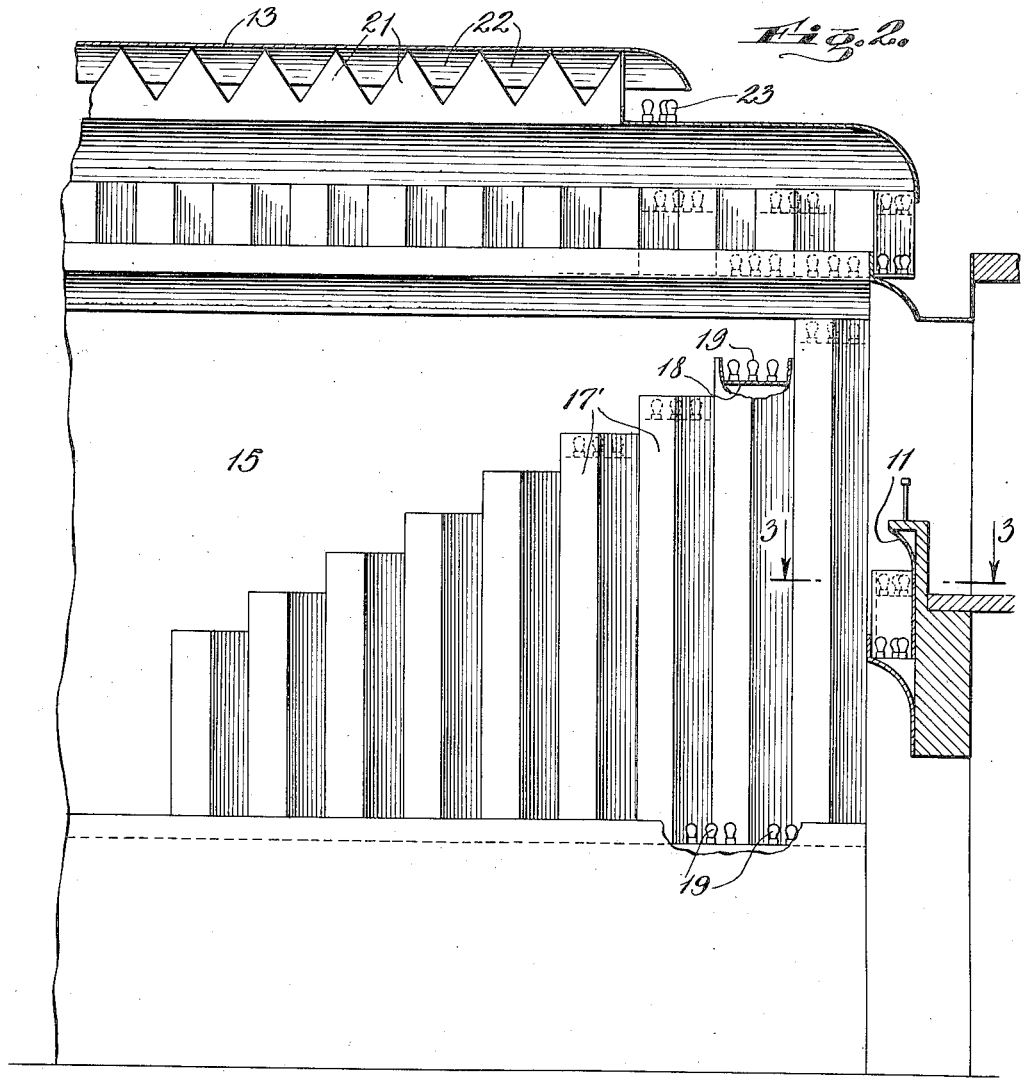
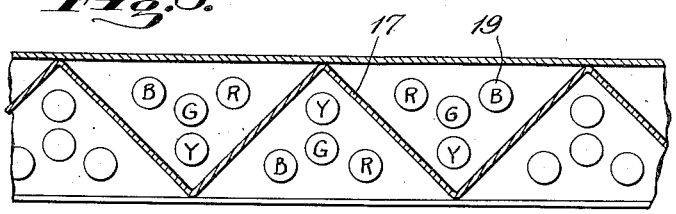
INVENTOR.
WINOLD REISS
BY Myers & Jones
ATTORNEYS.

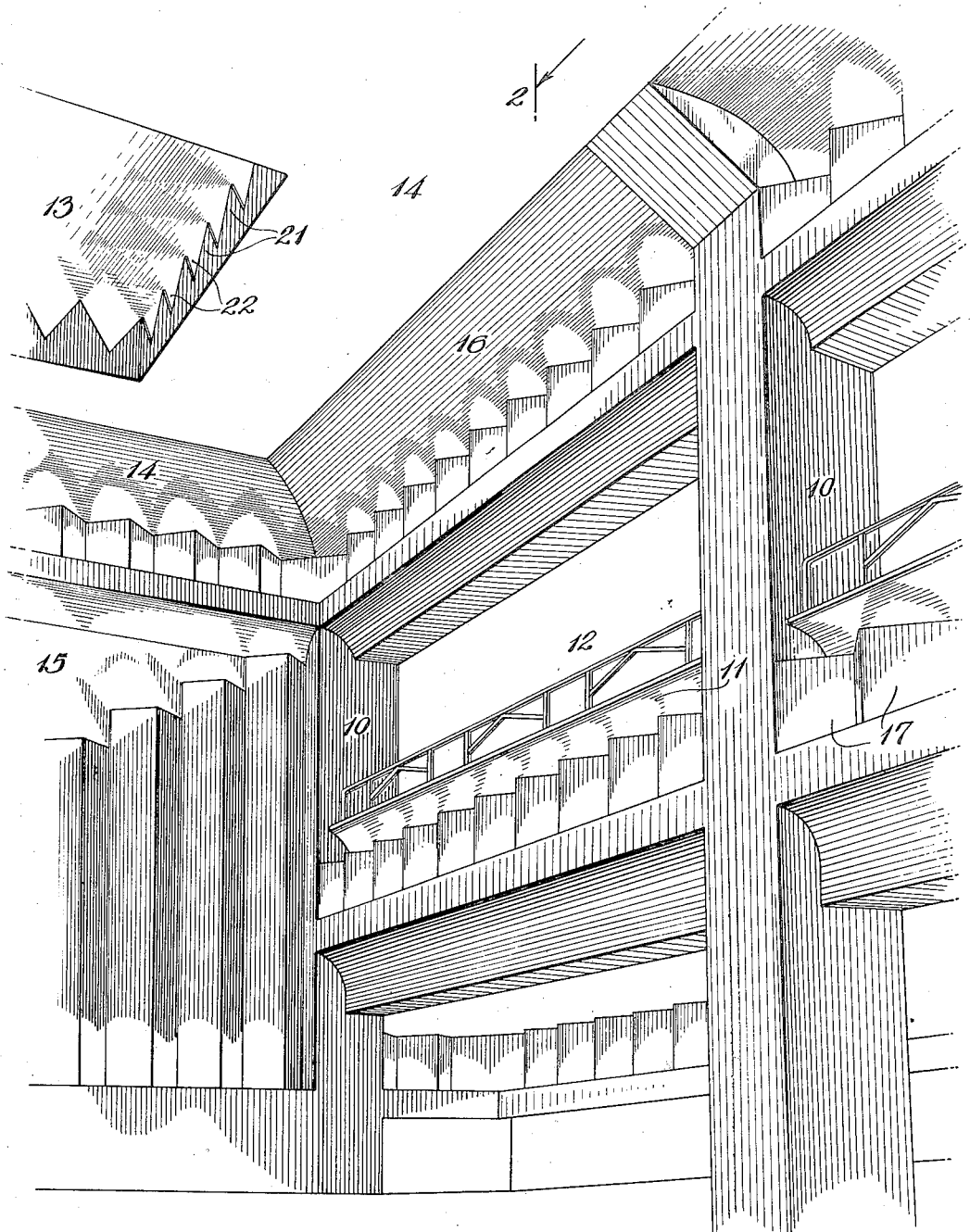

Feb. 4, 1936.   W. REISS   2,029,543
METHOD OF AND MEANS FOR CREATING AND DISPLAYING
DECORATIVE EFFECTS WITH LIGHT
Filed Feb. 24, 1931    4 Sheets-Sheet 3
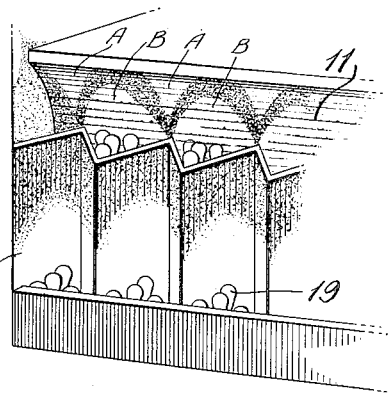
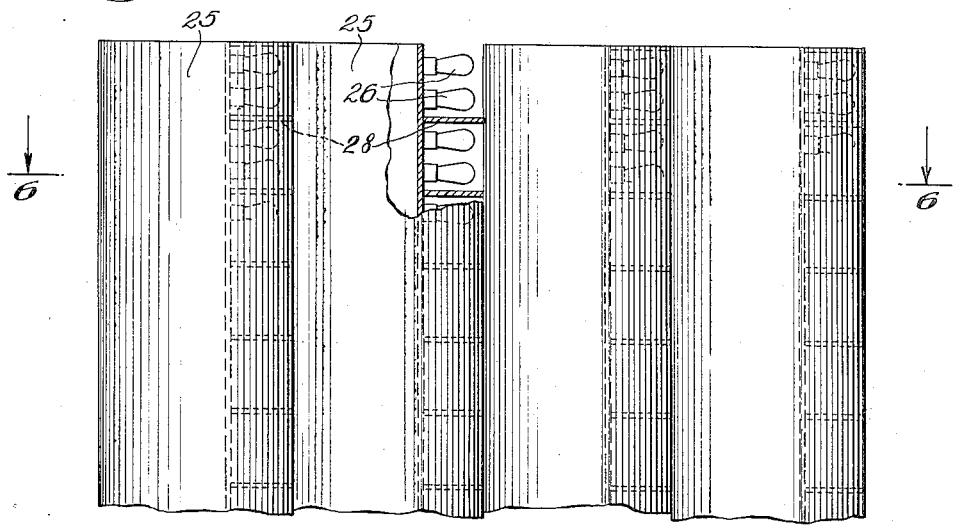
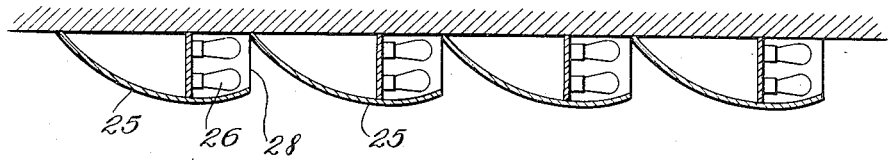
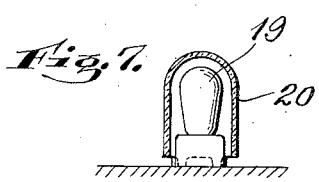
INVENTOR.
WINOLD REISS
BY Mayers + Jones
ATTORNEYS.

Feb. 4, 1936.   W. REISS   2,029,543
METHOD OF AND MEANS FOR CREATING AND DISPLAYING
DECORATIVE EFFECTS WITH LIGHT
Filed Feb. 24, 1931   4 Sheets-Sheet 4
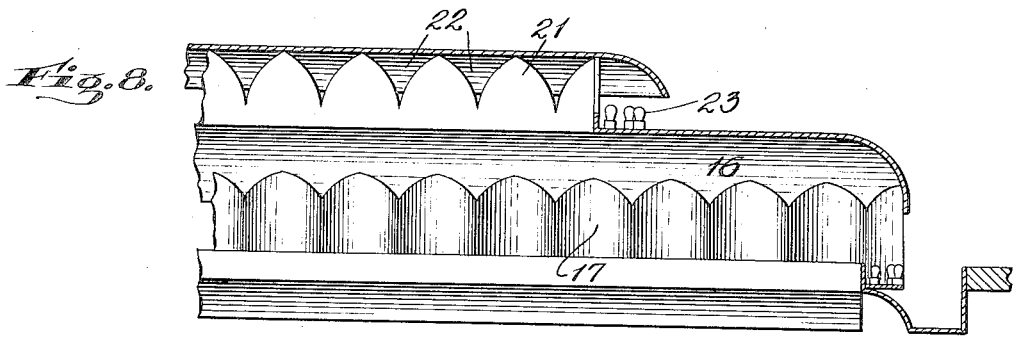
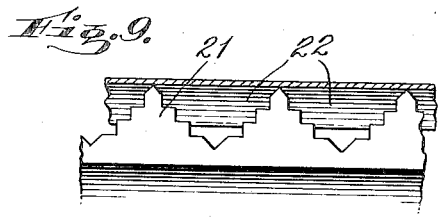
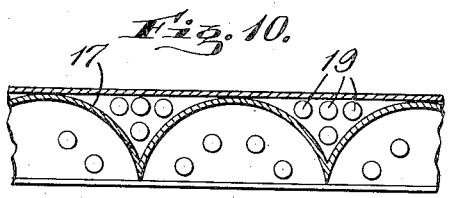
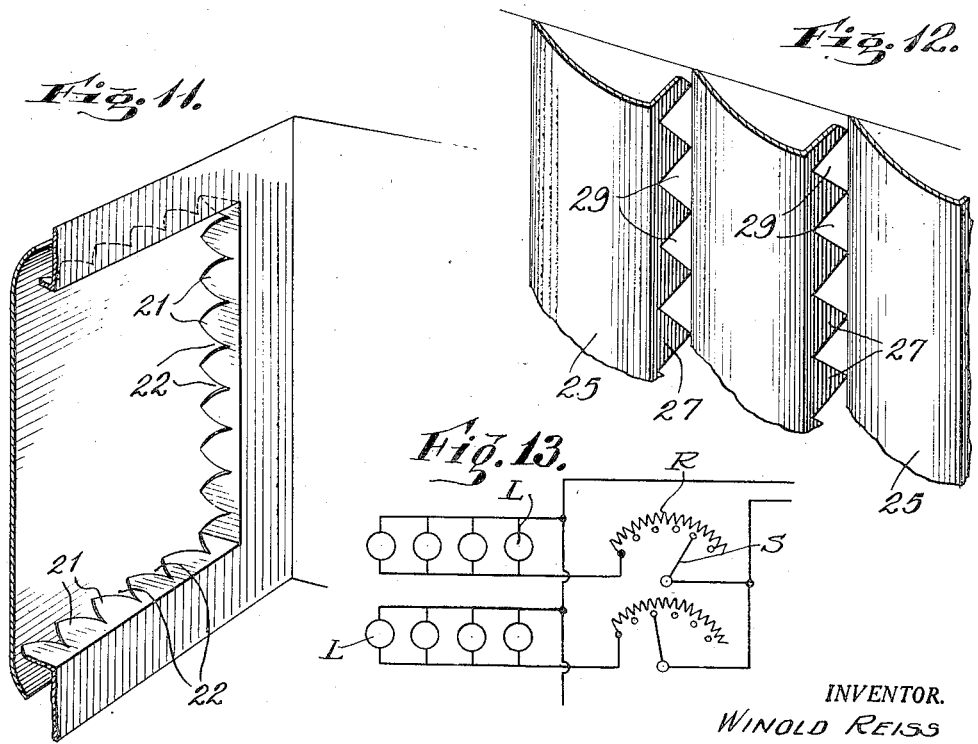
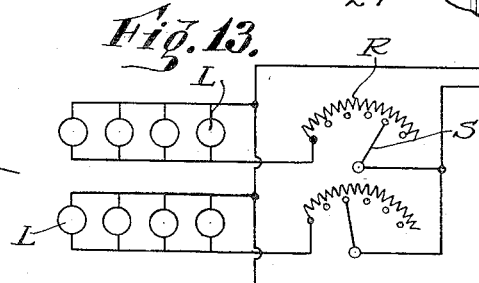
INVENTOR.
WINOLD REISS
BY Meyers Jones
ATTORNEYS.

UNITED STATES PATENT OFFICE 2,029,543

METHOD OF AND MEANS FOR CREATING AND DISPLAYING DECORATIVE EFFECTS WITH LIGHT

Winold Reiss, New York, N. Y.

Application February 24, 1931, Serial No. 517,998

27 Claims. (Cl. 240—9)

My invention relates to a method of and means for creating and displaying decorative effects with light, and is particularly adapted for use in auditoriums, theatres, hotels, churches and other structures, as well as in connection with small rooms, the exterior walls of buildings, on panels of various sizes, as well as advertising signs.

Prior to my invention it was the general practice to decorate structures by painting the surfaces either in plain colors or designs, and by utilizing ornamental plasterings, draperies, frescoes and the like. Illuminating fixtures of plain and elaborate design can be selected with care and placed to harmonize with the decorations, and it is possible, of course, to control the intensity of the illumination either direct or indirect, and to redecorate the walls, but even then the decorations and color schemes can be changed only by renovation.

An important object of my invention is to provide a new method and means of decorating by controlling and directing beams or rays of light so as to cause them to create decorative designs of various patterns on the surface to be decorated.

Another object of the invention is to so arrange the means for controlling the rays or beams of light relative to the lighting elements and surfaces to be decorated that the patterns or designs created can be changed or altered instantly.

Another object of the invention is to provide new types of wall structure particularly designed for decoration by light.

The foregoing and other objects of the invention may be accomplished by various constructions and arrangements each susceptible to innumerable alterations and variations. As a matter of fact the invention may be practiced under such a wide variety of formations and relative arrangements of elements that it would be very impracticable to attempt to illustrate and describe all of them in connection with a patent application, but reference will be made hereinafter to several representative embodiments and possible alterations or variations of the invention from which a clear understanding of the tremendous possibilities may be had.

A structure or surface to be decorated in accordance with my invention should preferably, though not necessarily, be a plain surface in the sense that it is smooth and of regular formation, and should be finished preferably with a coating of flat white or light paint or be covered with a suitable fabric or like covering. Adjacent this surface, in one embodiment of the invention, I propose the arrangement of irregular surfaces and lighting elements relative to the respective surfaces so that rays of light from the lighting elements will be intercepted in certain directions and diffused or permitted to pass in other directions to form designs or patterns on the regular surface.

In accordance with another embodiment of the invention specially constructed or shaped light interrupting elements are positioned adjacent the surface to be decorated and lighting elements are mounted relative to these interrupting elements and the surface so that rays of light will be intercepted in certain directions and projected on to the surface in other and preferably intersecting directions to form or create ornamental effects thereon in lights and shadows. The surface to be decorated as well as the light interrupting elements in all embodiments of the invention may be of different configurations to effect creation of various patterns or designs, that is, the plain surface may be flat or curved or specially designed and the light interrupting elements may be of various conventional, geometrical, or fanciful shapes and designs.

In another embodiment of the invention illustrated and described hereinafter, the wall surface is specially constructed in a plurality of sections for the practice of the invention.

In connection with all of the embodiments of the invention and variations thereof, aside from controlling the path of travel of the rays of light by the interrupting elements, I propose to also control the intensity of the lights in various combinations to obtain variations of the lights and shadows forming the pattern. If color is imparted to the rays of light, the patterns will naturally be created in color, and by varying the colors or combining different colors, it is possible to obtain such a variety of effects that a detail description thereof would be impossible, as the possible variations and combinations of color seems unlimited. While the use of particular colors is not within the scope of the invention, I would mention that a careful selection and blending of contrasting or harmonizing colors will afford very artistic and impressive decoration, for instance, those colors within the warm bands of the spectrum in various tints and tones can be imparted to the rays of light from the lighting elements to create designs in these warm colors, and in the same manner the colors within the cool bands of the spectrum can be combined, as well as contrasting colors from various bands of the spectrum. It is extremely interesting and surprising to know that the blending of colored rays of light violates all of the known laws of color mixing, for instance, colors in oil or water observe certain fixed and known rules such as that red and blue will give purple, but the color resulting from blending red and blue light is not a purple but something entirely different, and yellow and red light instead of giving the expected orange gives more of an amber.

In describing my invention I shall not dwell at great length nor in detail on the color combinations, as these are entirely optional and the field of selection is apparently unlimited, nor shall I dwell on the means for varying the intensity of the lights, as the well known apparatus for dimming lights in different circuits should be practical for the accomplishment of the desired purpose.

A better understanding of the invention and a full knowledge of all its objects and advantages may be had from the detail description of the accompanying drawings in which I have shown representative preferred embodiments of my invention and in which:

Fig. 1 is a perspective view of a corner of an auditorium or ball room decorated in accordance with embodiments of my invention;

Fig. 2 is a sectional view taken on the line 2—2 of Fig. 1 and looking in the direction of the arrows;

Fig. 3 is a fragmentary sectional view taken on the line 3—3 of Fig. 2;

Fig. 4 is a detail perspective view of a portion of a structure illustrating one of the many patterns obtainable and one embodiment of the invention;

Fig. 5 is a front elevation of a fragment of wall embodying a modification of the invention;

Fig. 6 is a sectional view on the line 6—6 of Fig. 5;

Fig. 7 is a detail view illustrating a hood for imparting color to rays of light from an electric bulb.

Fig. 8 is a fragmentary view partly in section through a ceiling showing variation of the invention;

Fig. 9 is a fragmentary view similar to Fig. 8 showing another variation;

Fig. 10 is a sectional view similar to Fig. 3 showing another modification;

Fig. 11 is a fragmentary perspective view of a vertical panel or sign embodying one form of the invention;

Fig. 12 is a fragmentary perspective view of a modification of Fig. 5; and

Fig. 13 is a diagrammatic view showing a form of theatre dimmer apparatus for controlling the intensity of the lights.

Referring to the accompanying drawings and particularly to Figs. 1–4 wherein I have illustrated portions of an auditorium or ball room with the invention applied to various surfaces thereof, the numeral 10 designates the columns between which the walls 11 are arranged in tiers with a balcony 12 between two of the tiers along the side walls. Panels 13 are provided in the ceiling 14 and the wall at the end of the auditorium is illustrated as being flat instead of curved like the side walls 11 and cove ceiling 16. I wish it to be understood that the embodiments of the invention shown in Figs. 1–4 are used here merely for the purposes of illustration and that it is possible and within the scope of the invention to have all of the walls of the room flat like the wall 15, or to have all of the walls arranged in continuous tiers or sections of wall like the side walls 11 from floor to ceiling, or to have panels like that shown in the ceiling arranged in vertical position as a part of the side walls, as will be more clearly understood in connection with the detailed description of the various elements hereinafter given.

I will describe first one embodiment of the invention as applied to decoration of vertical flat and curved walls, and cove ceilings such as the surfaces 11, 14 and 15, which are illustrated as being plain or smooth surfaces and to which a covering of preferably flat or egg-shell finish paint or the like, or suitable fabric is applied. I find that a flat white or neutral light color is well adapted to the practice of the invention, but the finish and tone or color of the surface is entirely optional.

In front of the walls such as 11 and 15 a plurality of members 17 are mounted in vertical or inclined position to form what may be termed an irregular or corrugated surface extending from the base of the wall to a point adjacent its top. The members 17 may be angular, curved, or of fanciful designs, and may be constructed of any material suitable to the accomplishments of the results hereinafter described. Mountings 18 such as brackets or other supports for illuminating elements 19, such as electric lights, are provided between the wall and the members 17, preferably at a point adjacent the tops of the members 17, so that the lights will be obscured from view of persons in the room, while the rays of light will be intersected or diffused by the tops of the members 17. I prefer to have each mounting 18 provided with facilities for receiving several lighting elements for reasons to be hereafter explained. Mountings for illuminating elements are also provided in front of the members 17 obscured from view but positioned to project rays of light onto and across the front surface of the members 17 and intersecting rays from the lights mounted behind the members above the tops of the members 17. While I speak of the members 17 as collective individual elements, it is to be understood that they really constitute a continuous surface in the embodiment of the invention now being described and can be a single unitary structure. As mentioned, the particular form or design of the members is a matter of choice and they may be conventional, geometric, or fanciful creations.

It will be noted, by reference to Fig. 3, that each lighting element in each group is positioned relative to the various portions of the members 17 at a different angle so that the rays from each light will be intercepted at different angles relative to the members 17, and rays from lights in adjacent groups will intersect beyond the ends of the members 17 to create patterns in light and shadows on the walls. One effect obtained on the wall 11 by the arrangement shown in Figs. 2 and 3 is illustrated in Fig. 4 showing the pattern of lights and shadows and wherein the dark area represents the shadow and the lighter areas indicate the light. The curvature follows that of the wall and the light areas marked A are formed by light coming from the lighting elements in front of and on opposite sides of the pleated or irregular surface 17, while the areas marked B are illuminated from rays coming from the lighting elements behind the surface 17. It should be readily understood that similar effects can be obtained on a flat wall such as 15, but due to the fact that the wall would not extend out over the surface 17, it would be necessary to have the groups of lights in front of the surface 17 disposed at a point sufficiently distant from the surface 17 to permit rays of light therefrom to pass across the tops of the surface onto the wall. This is one of the many variations to which the invention is susceptible. By arranging the lights in different groups in independent circuits or by varying the intensity of the different lights, numerous alterations of the patterns and decorative effects can be obtained. Referring to Fig. 3 assume that all lights marked B, R, G and Y, respectively, are in independent circuits, if only the lights marked B are turned on the pattern of light and shadow will be at a predetermined point on the surface and if these lights are turned off and if the lights marked R are turned on the same pattern but at a slightly different point will be created, due to the different relative positions of the lights and surfaces, and if lights in different selected circuits, or if all of the lights are turned on at one time still other variations will be obtained.

It is also possible to create the patterns in colors or to impart colors to the patterns of light and shadow. This may be accomplished by providing a colored hood 20 over each of the lighting elements. Referring again to Fig. 3 assume that the lights B, R, G and Y are provided respectively with hoods of blue, red, green and yellow color. If only the red lights are turned on the patterns will be formed in shadows and lights of red, and if the red are turned off and the green turned on, a similar pattern will be created in green and so on, with the different individual colors. If the red and blue lights are turned on at the same time designs in a blended color will be created on the wall and surface 17, and if the blue lights are turned off and the yellow turned on with the red, the same design in another blended color will be created at a slightly different point due to the different relative positions of the lights and light interrupting or intersecting member 17. This change as well as many others in various alternating blended and plain colors can be made instantaneously by turning various lights in different circuits on and off at will. The number of lights in each group, the various combinations of color, the degrees of intensity of the lights, and numerous other possible variations and arrangements of lights and light intersecting members is too extensive for any further detail description.

The illustration of the arrangement on the end wall 15 is another means for decorating with light according to my invention by providing stepped light interrupting members 17' of different lengths with lighting elements arranged similarly to those of Fig. 3. I have also illustrated the light interrupting members as of curved formation in Figs. 8 and 10, and of fanciful design in Fig. 9.

My invention is also applicable to the decoration of panels of various shapes and for various purposes, and in Figs. 1 and 2 I have shown a panel 13 located in a ceiling and having its sides in the nature of an irregular surface, at right angles to the regular surface of the panel and provided with a plurality of light interrupting or intersecting formations between which are openings 22. In Fig. 8 I have shown these light interrupters and openings as being curved and of conventional design in Fig. 9. Lighting elements 23 are positioned adjacent the regular surface of the panel and behind the sides so that they are obscured from view but rays of light emanating therefrom will be cut off in certain directions by the interrupters 21 and will pass through the openings 22 in predetermined directions and will intersect and cross at various points on the regular surface. Again the pattern is formed by lights and shadows and coloration thereof may be effected by utilizing various color imparting hoods in connection with the lights as previously explained. The design pattern is determined by the shape of the openings and interrupters and relative positioning of the lights with respect to the interrupters.

Vertical panels of walls, panels for display or advertising and for ceilings in various structures may be decorated in this manner, an illustration thereof being given in Fig. 11.

In Figs. 5 and 6, I have illustrated a special wall construction to be decorated with light, and embodying a plurality of sections 25 to be arranged from ceiling to floor to constitute the wall, or to be used in panels, or as a part of any surface. Each section may be of geometric, conventional or special design, but I have illustrated them as being arcuate and slightly overlapping, with a plurality of lights 26 along the inner surface of each member confronting the outer surface of the next, so that lights are disposed on opposite sides of each panel. The lights 26 may be grouped and the groups separated by partitions 28, and an arrangement of interrupters 27 and openings 29 may be provided along the edge of each panel between the lights and the adjacent panel to create designs thereon, it being understood that the numerous variations of intensity and color of lights, circuits, and patterns as previously explained may be had under this construction. I also contemplate pivoting the panels to afford a closed surface at times if desired.

In Fig. 13, which is purely an illustrative diagrammatic view of a form of theatre dimmer apparatus, the letter R designates the resistances across which move the switch arms S connected to the banks of lights L which are included in a circuit with the resistances and the switches so that the intensity thereof is controlled by the positions of the switches relative to the resistances. The operation should be obvious, and there are many different types of theatre dimmers well known and in use which might be employed for the accomplishment of the purposes hereinbefore specified.

I claim:

1. In combination with a plain surface of a building, a plurality of lighting elements adjacent said surface, and an irregular surface adjacent said plain surface and lighting elements to effect diffusion of light rays in predetermined directions and to cut off passage of rays of light in other predetermined directions whereby patterns in lights and shadows are created on said plain surface.

2. In combination with a plain surface of a building, a plurality of lighting elements of varying intensity adjacent said surface, and a corrugated surface adjacent said plain surface and lighting elements to effect projection of rays of light in other predetermined directions whereby patterns in lights and shadows are created on said plain surface.

3. In combination with a surface of a building, a plurality of lighting elements adjacent said surface, means for imparting colors to rays of light traveling in the direction of the surface, and means for distributing colored rays of light in predetermined directions on said surface and for intercepting rays of light in other directions whereby designs are created on said surface.

4. In combination with a surface of a building, a plurality of lighting elements of varying intensity adjacent said surface, means for imparting colors to rays of light traveling in the direction of the surface, and means for distributing colored rays of light in predetermined directions on said surface and for intercepting rays of light in other directions whereby designs are created on said surface.

5. A decorative wall construction comprising a plain surface, an irregular surface adjacent said surface, and lighting elements on opposite sides of said irregular surface, said lighting elements being positioned in different horizontal planes.

6. A decorative wall or ceiling construction comprising a surface, a housing having a plurality of spaced light obstructing members adjacent said surface, and a plurality of lighting elements within said housing positioned relative to said members whereby rays of light passing through the spaces between said members will be crossed in different directions to form decorative light and shadow effects on said surface.

7. A decorative wall or ceiling construction comprising a surface, a housing having a plurality of spaced light obstructing members adjacent said surface, and a plurality of lighting elements within said housing positioned relative to said members whereby rays of light passing through the spaces between said members will be crossed in different directions to form decorative effects on said surface, and means intermediate said lighting elements and interrupting members to impart different colors to the rays of light and decorative effects projected on to said surface.

8. An installation for decorative illumination comprising a plurality of fixed sources of light, a fixed non-transparent screen, fixed opaque means adjacent said screen for intercepting light from said source to cast ornamental shadows upon the screen, and means for varying the relative intensity of illumination from said light sources to produce variations in said ornamental shadows.

9. An indirect lighting installation comprising a light reflecting screen, a series of ornamental flutings contiguous to said screen, concealed lights in front of the respective flutings, the free edges of said flutings determining lines of shade demarcation upon said light reflecting screen.

10. An indirect lighting installation comprising a light reflecting screen, an undulating wall conformation having a free edge adjacent said screen, concealed lights in the troughs of said wall conformation, the upper edges of the latter determining umbral areas upon said screen by intercepting some of the projected light rays.

11. An indirect lighting installation comprising a curved wall determining a light reflecting screen, flutings distributed along the length of said wall and having free edges adjacent the curvature of said wall, concealed lights in front of said flutings illuminating the respective surfaces thereof and said screen, said flutings casting ornamental shadows upon said screen.

12. An indirect lighting installation including vertically disposed light intercepting and light reflecting flutings, a curved wall structure above the upper edges of said flutings and concealed sources of light in front of said flutings.

13. An indirect lighting system comprising vertically arranged flutings having sharp upper edges, a wall portion curved over said free edges and constituting a light reflecting screen and concealed lights in front of said flutings illuminating the latter and casting ornamental shade areas due to light interception by said flutings.

14. In an indirect lighting system for a wall structure, the combination of opaque flutings exposed in front of the wall, said wall having a portion spaced from and extending at an angle with respect to the edge of the flutings, lights concealed in front of the flutings and thereby casting upon the reflecting screen ornamental illuminated areas alternating with shadow areas determined by the flutings, and lights concealed in back of the various flutings for contrasting illumination of the wall.

15. In an indirect lighting installation for a wall portion, the combination of a fluting structure extending in front of said wall portion and having a free open edge, said wall portion extending at an angle along said edge, lamps of different colors disposed in front of the various flutings at the part thereof remote from said wall portion, wainscoting concealing said lights, and lights in back of the various flutings and near said wall portion.

16. In an indirect lighting installation, a light reflecting screen, a fluting structure extending in front of said screen, said screen extending at an angle along the edges of said flutings, lamps of different colors disposed in front of the various flutings at the part thereof remote from said screen, wainscoting concealing said lamp, and lamps in back of the various flutings near the portion of the latter adjacent said screen, the lamps in the sets in front of the flutings being of divers colors.

17. In an indirect lighting installation, the combination of a fluting structure, a wall structure extending along the free open edges of and at an angle relative to the lengths of the flutings, lamps of divers colors disposed in front of the various flutings at the part thereof remote from said wall structure, wainscoting concealing said lamps, and lamps in back of the various flutings near the portion of the latter adjacent said wall structure, the lamps of said second set being of divers colors.

18. An indirect lighting installation for a wall having a coping, said installation comprising a series of flutings open at their upper edges, extending along the wall and below the coping, lights supported in front of the various flutings, a screen concealing said lights and exposing the upper portion of said flutings for illumination by said lights, whereby said flutings illuminated by said lights will effect ornamental patterns of light and shade upon said coping.

19. An indirect lighting installation for a wall having a coping, determining a light reflecting screen, said installation having a series of vertical flutings below said coping and open at their tops, and lamps behind the respective flutings.

20. An indirect lighting installation for a wall having a coping determining a light reflecting screen, said installation having a series of vertical flutings below said coping, open at their tops, and a set of lamps of divers colors disposed behind the respective flutings.

21. An indirect lighting installation for a wall having a coping determining a light reflecting screen, said installation having a series of vertical flutings below said coping and open at their tops, a group of lamps of divers colors disposed in front of each of the flutings, a screen concealing said various lamps and lamps concealed behind the respective flutings and near the upper edges of the latter.

22. An indirect lighting installation for a wall having a coping determining a light reflecting screen, said installation having a series of vertical flutings below said coping and open at their tops, a group of lamps of divers colors disposed in front of the various flutings near the lower edges thereof, a screen concealing said lamps and a group of lamps of divers colors concealed behind the respective flutings and near the upper edges thereof.

23. An indirect lighting installation for a room having a coping, said system comprising a series of vertical open top flutings extending along said wall below said coping, lamps in front of the various flutings near the lower ends thereof and screens concealing said lamps.

24. An indirect lighting system for a room having a balcony with a coping, said system comprising a series of vertical flutings below the coping, lamps in front of the flutings near the lower ends thereof and screens concealing said lamps.

25. An indirect lighting installation for the border of a ceiling comprising a series of flutings extending at an angle to the ceiling, lamps concealed in front of said flutings, illuminating the latter and casting a pattern of light and shade bordering the ceiling.

26. An indirect illuminating installation comprising a light reflecting surface to be illuminated, an opaque screen, a source of light at one side of said screen, casting an ornamental shadow pattern on said surface and another source of light at the opposite side of said screen and concealed thereby for direct illumination of the normally shaded area of the surface.

27. An indirect illuminating installation comprising fixed undulatory light intercepting means, a fixed screen extending longitudinally of said light intercepting means and adjacent thereto but spaced therefrom, and a series of colored lights at the side of said intercepting means spaced from said screen and distributed along the length of said intercepting means in the various undulations thereof.

WINOLD REISS.